United States Patent [19]

Kotrotsios et al.

[11] Patent Number: 5,067,815
[45] Date of Patent: Nov. 26, 1991

[54] OPTICAL SENSOR WITH INTERMODAL INTERFEROMETRY

[75] Inventors: Georges Kotrotsios, Neuchatel; Olivier Parriaux, Lausanne, both of Switzerland

[73] Assignee: Centre Suisse D'Electronique et de Microtechnique S.A., Neuchatel, Switzerland

[21] Appl. No.: 581,962

[22] Filed: Sep. 13, 1990

[30] Foreign Application Priority Data

Sep. 15, 1989 [CH] Switzerland ............... 03374/89

[51] Int. Cl.$^5$ ............................................. G01B 9/02
[52] U.S. Cl. ................................... 356/345; 356/351; 250/227.16
[58] Field of Search ............ 356/345, 73.1, 351; 250/227.16, 227.15, 227.19; 350/96.15

[56] References Cited

U.S. PATENT DOCUMENTS 4,477,725 10/1984 Asawa et al. ............... 350/96.15
4,768,851 9/1988 Shaw et al. ..................... 356/345

Primary Examiner—Samuel Turner
Assistant Examiner—Richard E. Kurtz, II
Attorney, Agent, or Firm—Parkhurst, Wendel & Rossi

[57] ABSTRACT

An optical sensor with intermodal interferometry, using a bimodal optical fiber propagating a first mode and giving rise to a second mode coupled to the first in response to a disturbance cause by a physical or chemical quantity of which it is wished to determine the position along the optical fiber by compensating the difference in the delay time between modes at the input of the interferometer.

7 Claims, 1 Drawing Sheet

OPTICAL SENSOR WITH INTERMODAL INTERFEROMETRY

FIELD OF THE INVENTION

The present invention relates generally to distributed sensors with mode coupling generated by disturbance, the position of which it is wished to determine along a light guide, and relates more particularly to an optical sensor with intermodal interferometry.

BACKGROUND OF THE INVENTION

The document "Birefringent Stress Location Sensor" (R. B. Franks et al., SPIE, vol. 586, Fiber Optic Sensors 1985) shows a distributed sensor using a frequency modulated laser source injecting a single mode into a birefringent or monomode optical fiber used as a bimodal fiber. Under the influence of an external parameter, a disturbance, in the occurrence of microbends, generates mode coupling giving rise to the propagation of a second mode in the fiber. Detection is effected by intermodal interferometry. Determination of the position of the disturbance is deduced from measurement of the beat frequency of the detection signal.

There are several problems associated with the above-discussed sensor. Specifically, measurement of the coupling efficiency and determination of the position of the coupling along the fiber are rendered difficult by problems of:

linearity of the frequency gradient of the modulation signal;
stability of the source;
backscattering;
attenuation of the detection owing to the polarization and to the mixing of modes.

SUMMARY OF THE INVENTION

An object of the present invention is to provide an optical sensor which permits determination of the position of a disturbance along an optical fiber without encountering the disadvantages mentioned above.

Another object of the present invention is to provide an optical sensor in which determination of the position of the disturbance is effected by intermodal interferometry.

The optical sensor with intermodal interferometry of the present invention is characterized in that it associates:

(a) optical means respectively permitting
the emission of a light wave;
the injection into a bimodal optical fiber of said light wave; and
guidance of said light wave by means of the bimodal optical fiber;

(b) means distributed along the bimodal optical fiber permitting coupling of the fundamental mode $LP_{01}$, or of the polarization mode of the injected light wave to the first order mode $LP_{11}$ or to the orthogonal polarization mode, respectively;

(c) an interferometer permitting the compensation of the difference in the delay time between coupled modes at the input of the interferometer, by modification of the conditions of interference of the interferometer; and (d) electrical means permitting
measurement of the modification made to the interferometer;
the detection, in intensity, of the interference product; and
determination of the position, along the bimodal optical fiber, of the disturbance which created the intermodal coupling.

The main advantages of the present invention reside in the fact that the dynamic range of the system and the spatial resolution are increased with respect to those of known solutions. As the sensor operates in transmission, nearly all the energy injected is detected. The electronics remains identical, whether the system comprises a single or several transducers. The light source, in particular as far as its polarization and stability are concerned, does not require the most strict characteristics. Contrary to an optical system, operating by optical reflectometry in the temporal (OTDR) or frequential (OFDR) domain, the sensor according to the present invention does not require averaging over a large number of measurements and for this reason the response time of the system is shorter.

BRIEF DESCRIPTION OF THE DRAWINGS

Other objects, characteristics and advantages of the present invention will become clearer upon reading the following description made in relation to the attached drawings, in which.

DETAILED DESCRIPTION OF THE PREFERRED EMBODIMENTS

Figure 1:
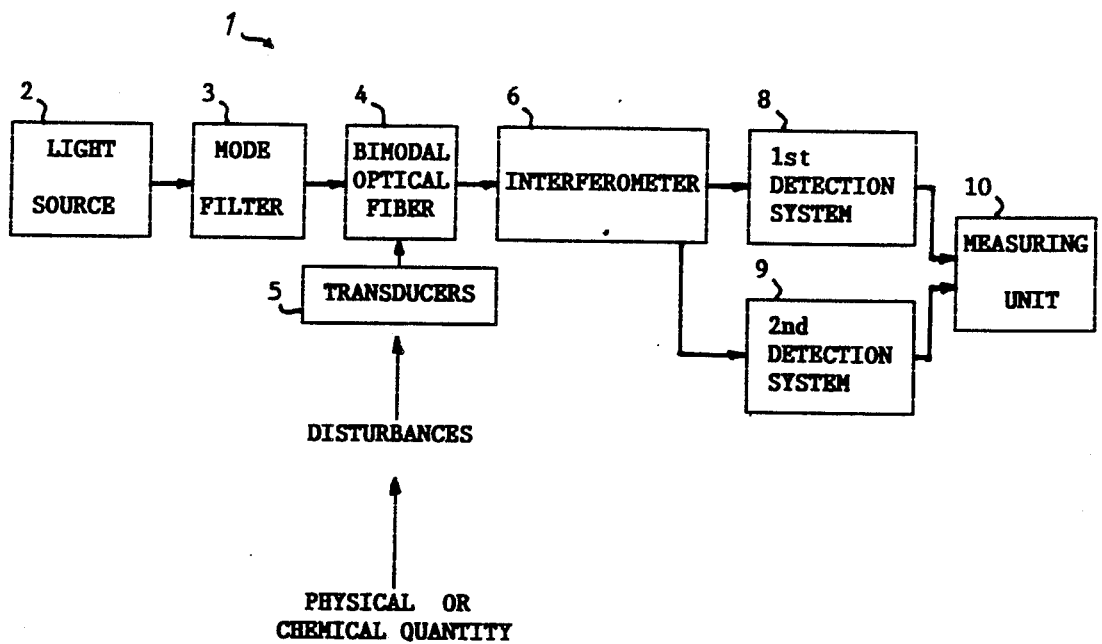
FIG. 1 is a synoptic representation of the optical sensor with intermodal interferometry according to the invention.

FIG. 1 is a synoptic representation of the optical fiber sensor according to the invention.

The optical sensor with intermodal interferometry 1 mainly comprises, following the optical path, a light source 2, a bimodal optical fiber 4 along which are distributed transducers 5, an interferometer 6, and first 8 and second 9 detection systems connected to a measuring unit 10.

A mode filter 3 may be used at the input of the optical fiber, in which case the first end of the optical fiber is then connected to the mode filter 3. In the absence of a mode filter at the input of the optical fiber, the light source and optical fiber connection would be equivalent to a transducer. In every case the second end of the optical fiber faces the interferometer.

The optical sensor with intermodal interferometry uses a light source 2 which emits a non-monochromatic light wave.

Filtering of the modes other than the fundamental mode $LP_{01}$ or the polarization mode is effected at the input of the optical fiber 4 by the mode filter 3.

The optical fiber 4, which is monomode in a given range of wave lengths, for example around 1.3 μm, in fact propagates waves of lower wave length, for example 0.8 μm.

The optical fiber 4 may be subjected, through the intermediary of the transducers 5 to one or more localized or distributed disturbances generated by a physical or chemical quantity to be detected. Under the influence of such a disturbance, the injected mode being propagated in the optical fiber 4 may be coupled to a mode of a higher order. The two modes then propagate in the guide with a coupling rate dependent upon the amplitude of disturbance and the various propagation speeds.

At the input of the interferometer one may observe a difference in arrival time between the injected mode and the coupled mode. The delay time between these modes is proportional to the difference between the optical paths travelled, in the bimodal optical fiber, by each of the modes. It is the difference between the propagation speeds of the two modes which causes a difference between the optical paths. Determination of this difference between optical paths allows the deduction of the position of the disturbance which gave rise to the coupled mode.

This determination is effected by injecting the light wave leaving the optical fiber into the interferometer. The measurement relates, at first, to the interference product delivered on exit from the interferometer.

Interferences between the light waves propagating in each of the two branches of the interferometer are obtained in two cases:

when the two optical paths of the interferometer are equal, independently of the disturbances along the optical fiber; and when the difference in optical path between the two branches of the interferometer compensates the difference between the optical paths travelled in the fiber by each of the modes.

In the first case each mode interferes with itself.

The introduction of a difference in optical path between the two paths of the interferometer is obtained by a modification of the length and/or the refractive index of at least one of the branches of the interferometer. Each of the variations effected permits compensation of the delay time between modes at the input of the interferometer, the delay time being defined by each of the transducers distributed along the fiber.

In other words, each transducer distributed along the optical fiber is associated, in a biunique manner, with a given variation. It follows from the above that measurement also relates to the given variation.

The first and second detection systems detect, respectively, the maximum of the interference product and the corresponding variation. The measuring unit deduces from these measurements the position of the disturbance along the optical fiber.

By way of example, for a length of fiber of one meter the difference between the mode propagation time is of the order of 2 picoseconds, for a light source consisting of an electroluminescent diode of a wave length of 880 nm.

The accuracy obtained in determining the position of the disturbance depends on the accuracy with which the first detection system may localize the maximum of the amplitude of the interference fringes. It has been possible to obtain a resolution lower than 50 $\mu$m, i.e., a temporal resolution lower than 0.2 picoseconds. This time interval corresponds to a propagation in the bimodal fiber of 5 mm. In other words, the spatial resolution of the optical sensor with intermodal interferometry is better than 5 mm.

The total number of transducers which can be multiplexed in the displacement range of the mobile mirror depends on the width of the intermodal interference phenomenon, which is equal to the coherence length of the light source. In other words, the total number of transducers capable of being multiplexed is given by the relationship between the displacement range of the mobile mirror and the coherence length of the source.

By way of example, for a source with a half-height spectral width of 70 nm and a coherence length of 700 $\mu$m and for an interferometer permitting a displacement range of the mobile mirror of 40 mm, the number of transducers is around 55.

Figure 2:
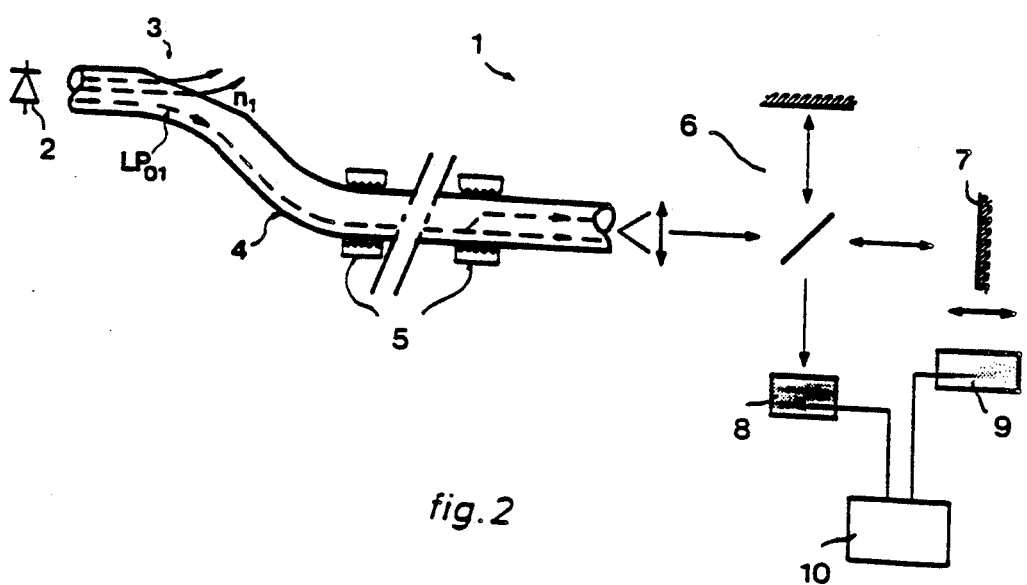
FIG. 2 is one embodiment of the optical sensor according to the present invention.

FIG. 2 shows a first exemplary embodiment according to which the light source 2 is a multimode laser diode. The modes other than the fundamental guided mode $LP_{01}$ are filtered at the input of the optical fiber 4 by a mode filter 3. The latter consists of a laterally polished fiber in which the only component which remains guided is the fundamental mode, the higher order modes radiating outwards. For this, the index $n_1$ of the external environment surrounding the polished fiber must fulfill the relationship:

$n_{11} < n_1 < n_{01}$; where $n_{01}$ and $n_{11}$ respectively represent the effective indices of the fundamental mode $LP_{01}$ and the first order mode $LP_{11}$. The optical fiber 4 monomode in a given range of wave lengths, typically around 1.3 $\mu$m, which propagates the fundamental mode of the lowest wave length, typically 0.8 $\mu$m, is subjected to disturbances transmitted by transducers 5 distributed along the fiber. The transducers may be simultaneously active. The transducers 5 generate micro-bends of the fiber of spatial period$\Lambda$, determined in such a way that the expression $\Lambda = \lambda_o/(n_{e01} - n_{e11})$, where $\lambda_o$ the central wave length of the source, $n_{e01}$ is the effective index of the fundamental mode $LP_{01}$, and $n_{e11}$ is the effective index of wave mode one $LP_{11}$, is verified.

The optical sensor with intermodal interferometry generally comprises a light source 2 coupled to a mode filter 3 which may be: a polished fiber as described by R. A. BERGH et al., "Single-Mode Fiber-Optic Polarizer", Optics Letters/Vol. 5, No. Nov. 11, 1980, pp. 479–481, two fibers—one bimodal, the other monomode—connected end to end, or even a fiber bevelled by drawing at high temperature (c.f. V. SHAH et al. /"Bioconical Tapered Fiber-Mode Filter For Bimodal Systems"/OFC 88/WQ13).

The optical fiber 4 is a monomode fiber with a given wave length and operating on a lower wave length, the modes capable of self-propagation being guided modes: fundamental mode $LP_{01}$; first order mode $LP_{11}$; and possible higher order modes.

The optical fiber 4 may also be a birefringent fiber propagating polarization modes.

The transducers arranged along the optical fiber are all devices, such as micro-bends transducers, permitting generation of coupling between modes under the effect of the parameter to be detected. A monomode or bimodal optical fiber facing a bimodal optical fiber may be used as a mode coupling transducer.

The interferometer is of the Michelson type, the Mach-Zehnder type or even of the Fabry-Perot type.

The light source consists of a typical DC current source. On the detection portion of the optical sensor an integrated photodetector-amplifier was adopted. In the particular experiment mentioned above an HFD-1060 photodetector from EG & G Photon Devices was used. The photodetector has such an arrangement of external components as to provide a bandwidth of 80 KHz, necessary to observe the interference pattern. As the interferometer branch scans at constant velocity, the interference fringes appear at constant time intervals.

This permits synchronous detection of the interference fringes by using either filters or lock-in techniques.

This improves the SNR (Signal to noise ratio) of the system.

However, the appearance of interference fringes may be masked, if all the light emerging from the fiber end is intercepted by the sensitive area of the photodetector. This is due to the LP-mode orthogonality. The detected fringe has two equal parts along the fiber diameter, one positive and one negative (following the $LP_{11}$ mode symmetry), which compensate each other when added on the photodetector. For that reason one of these two parts must be masked using an appropriate stop, after the fiber end.

The optical sensor of the present invention is useful for detection and determination of the positions of changes in environmental parameters, for example, as intrusion, force, pressure and temperature detectors, as well as hydrogen sensors, and the like.

The foregoing detailed description of the invention is not intended to limit the scope of the present invention, as described in the claims appended hereto.

We claim:

1. An optical sensor with intermodal interferometry, comprising:
   optical means respectively permitting emission of a light wave, injection into a bimodal optical fiber of said light wave, and guidance of said light wave by means of said bimodal optical fiber;
   means distributed along said bimodal optical fiber permitting coupling of a fundamental mode $LP_{01}$ or of a polarization mode of said injected light wave to a first order mode $LP_{11}$ or to an orthogonal polarization mode, respectively;
   an interferometer permitting compensation of a difference in delay time between coupled modes at an input of the interferometer, by modification of conditions of interference of said interferometer; and
   electrical means permitting measurement of said modification made to said interferometer, detection, in intensity, of a product of said interference, and determination of a position, along said bimodal optical fiber, of a disturbance which created the intermodal coupling.

2. An optical sensor with intermodal interferometry according to claim 1, wherein said optical means further comprise means for permitting filtering of modes of said light wave other than the mode of said injected light wave.

3. An optical sensor with intermodal interferometry according to claim 1, wherein said optical means comprise a non-monochromatic source.

4. An optical sensor with intermodal interferometry according to claim 2, wherein said means of filtering comprise a modes filter consisting of a bimodal fiber connected to a monomode fiber, a polished bimodal fiber, or a fiber bevelled by drawing at high temperature, these fibers being waveguides in which there remains only the fundamental guided mode $LP_{01}$ or the polarization mode, all other modes of light wave being purged.

5. An optical sensor with intermodal interferometry according to claim 1, wherein the wave guiding means comprise a monomode optical fiber for a given range of wave lengths and operating in a range of lower wave lengths permitting propagation of non-coupled guided modes, or a birefringent optical fiber permitting propagation of polarization modes.

6. An optical sensor with intermodal interferometry according to claim 1, wherein the interferometer comprises a Michelson type interferometer, a Mach-Zehnder type interferometer, or a Fabry-Perot type interferometer.

7. An optical sensor with intermodal interferometry according to claim 1, wherein the means distributed along the optical fiber are transducers generating micro-bends of given spatial periods, a monomode optical fiber facing a bimodal optical fiber, or a bimodal optical fiber facing a bimodal optical fiber.

* * * * *